Jan. 14, 1958 J. HADFIELD 2,819,686
WATER TANKS, FUEL BUNKERS, OR THE LIKE OF LOCOMOTIVES
Filed July 14, 1952 3 Sheets-Sheet 1
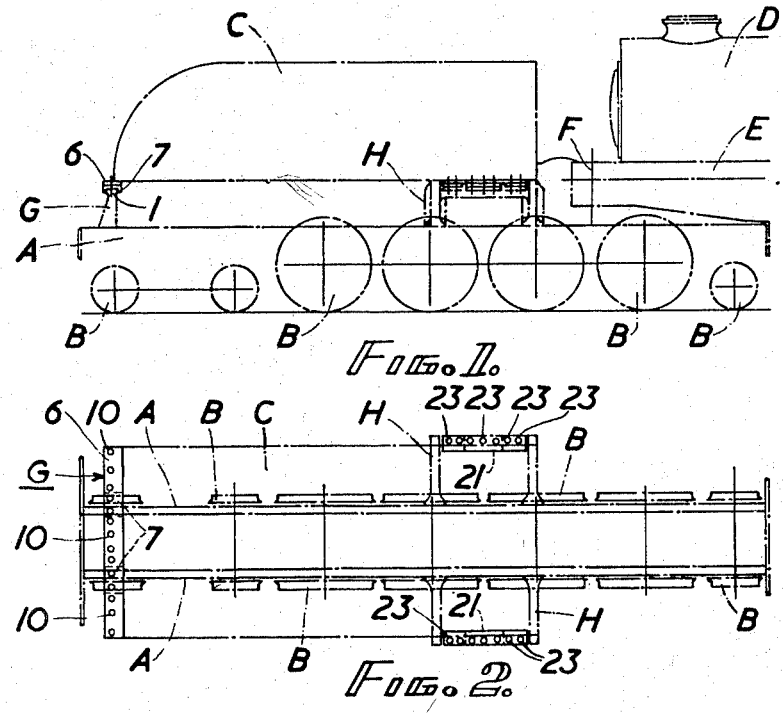
Inventor:
James Hadfield,
by Pierce, Scheffler + Parker,
Attorneys Jan. 14, 1958   J. HADFIELD   2,819,686
WATER TANKS, FUEL BUNKERS, OR THE LIKE OF LOCOMOTIVES
Filed July 14, 1952   3 Sheets-Sheet 2

Inventor:
James Hadfield,
by Pierce, Scheffler-Parker,
Attorneys.

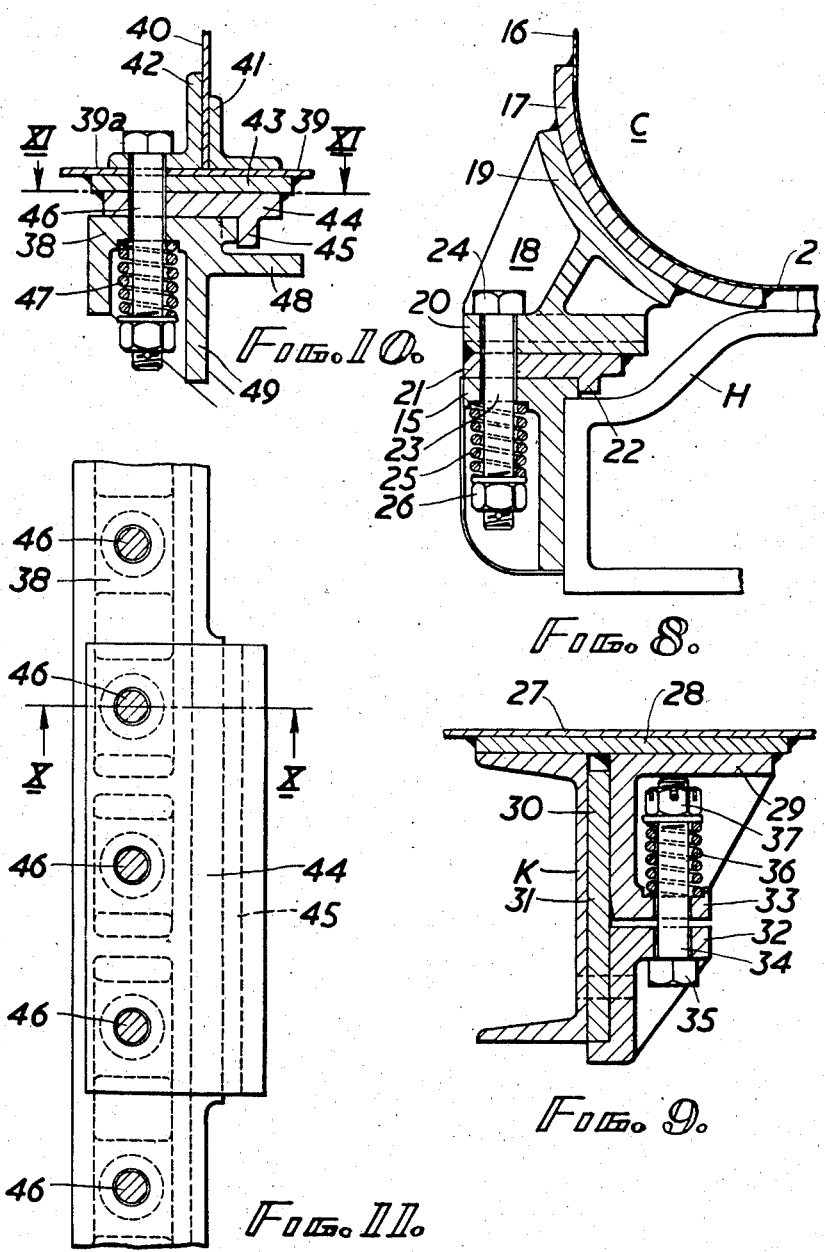

United States Patent Office 2,819,686
Patented Jan. 14, 1958

2,819,686

WATER TANKS, FUEL BUNKERS, OR THE LIKE OF LOCOMOTIVES

James Hadfield, Romiley, England, assignor to Beyer Peacock & Company Limited, Manchester, England, a British company Application July 14, 1952, Serial No. 298,711

Claims priority, application Great Britain July 19, 1951

5 Claims. (Cl. 105—362)

This invention relates to the water tanks, fuel bunkers or the like of locomotives, and refers more particularly to the means of securing such tanks, bunkers or the like in place. The invention has reference both to articulated locomotives wherein the water tanks and fuel bunkers are attached to the main frames of the articulated engine units, and also to ordinary type locomotives and tenders wherein the water tanks and fuel bunkers are supported on the frames of the locomotives and tenders.

Hitherto, water tanks and fuel bunkers have been rigidly attached to the frames upon which they are supported. Connections of this type have proven to be unsatisfactory since the frames of locomotives and tenders are subject to distortion which would be transmitted to the water tanks and fuel bunkers through the rigid attachments. While water tanks and fuel bunkers possess a high degree of rigidity by reason of their shape and construction, they are constructed of relatively thin plates not adapted to withstand the stresses imposed on them resulting from the aforementioned distortion of the supporting framework. In consequence the said water tanks and fuel bunkers frequently give trouble arising from fractures and leakage. To avoid the disadvantages resulting from these rigid connections, various yieldable connecting means have been proposed by the prior art. This invention relates to an improvement over the prior art in the yieldable connecting means.

The primary object of the present invention is to provide improved yieldable connecting means between the water tanks, fuel bunkers or the like and their supporting frameworks, so that the frameworks can be distorted without corresponding distortion being transmitted to the tanks, bunkers or the like. Thus, the latter remain free from undue stresses.

A more specific object of my invention is to provide yieldable connecting means having flexibility only in the vertical direction, positive location means being provided to prevent relative movement in a horizontal direction between the tanks or the like and the supporting framework, whether longitudinally or laterally.

In this way distortions of the supporting framework due to external forces, track conditions etc., can take place without transmitting excessive stresses to the structure of the water tanks and fuel bunkers.

In accordance with the preferred system, the tank or the like has fitments or brackets secured to it, which rest either direct on the framework of the engine or tender, or on corresponding fitments or brackets rigidly secured on said framework. The parts interengage in such a way that relative horizontal movement cannot take place between them either longitudinally or laterally, but the fitments or brackets on the tank or the like are free to be raised vertically from their normal seating position on the framework or on the fitments or brackets on said framework. Normally the fitments or brackets on the tank or the like are held down at their seating position not only by gravity but also by springs.

In this way it will be understood that, whereas the tank or the like is positively held against any horizontal movement relative to the frame of the engine or tender, the latter may be to a certain extent distorted without the distortion being transmitted to the structure of the tank or the like. Thus, upon such distortion taking place, a slight separation in a vertical direction will occur between, on the one hand, certain of the fitments or brackets on the tank or the like, and, on the other hand, the engine or tender frame or the corresponding fitments or brackets thereon. Such separation will be opposed by the springs, and the amount of stress applied to the tank or the like will be limited according to the stiffness of the springs.

In order that the invention may be the more clearly understood a number of constructions in accordance therewith will now be described, reference being made to the accompanying drawings, wherein:

Figure 1 is a diagrammatic side elevation of a portion of an articulated locomotive showing a tank mounted on the frame of an engine unit of said articulated locomotive in accordance with the invention.

Figure 2 is a diagrammatic plan of the same.

Figure 3 is a diagrammatic side elevation of an ordinary tender showing the tank mounted on the frame of the tender in accordance with the invention.

Figure 4 is a diagrammatic plan of the same.

Figure 8 is a sectional end elevation of another tank mounting of Figures 1 and 2.

Figure 9 is a sectional end elevation of another tank mounting of Figures 3 and 4.

Figure 10 is a sectional side elevation of another tank mounting for the side of a tank, the section being taken on line X—X of Figure 11.

Figure 11 is a sectional plan of said mounting, the section being on line XI—XI of Figure 10.

Figure 5:
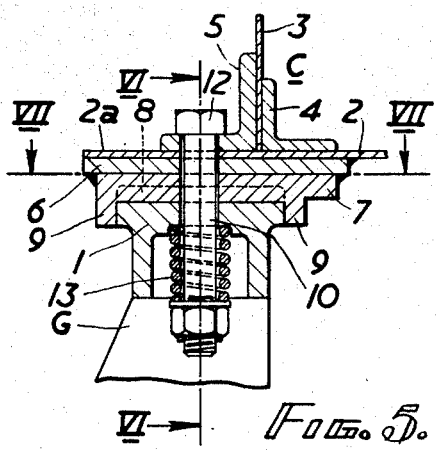
Figure 5 is a sectional side elevation of one of the tank mountings of Figures 1 and 2, and also one of the tank mountings of Figures 3 and 4, the section being on line V—V of Figure 6.

Referring first to Figures 1 and 2, these illustrate an articulated locomotive of the kind consisting of a boiler unit without wheels supported at its ends by engine units provided with track wheels. In the drawings only one of the engine units is shown. This consists of a frame A mounted on track wheels B and carrying a fuel or water tank C. One end of the boiler unit is shown. This consists of a boiler D mounted on a frame E. At each end the frame E is mounted on the frame A of the engine unit at that end by means of a pivotal mounting indicated by the line F.

In the present arrangement the frame A has a bracket G mounted on it to support the end of the tank C remote from the boiler unit, and has two brackets H mounted on it one each side to support the end of the tank C adjacent the boiler unit. The bracket G stands up some distance from the frame A and extends transversely the full width of the tank C which is considerably greater than the width of said frame. Each of the brackets H extends outwardly and upwardly from the frame A as indicated in the drawings.

Figure 6:
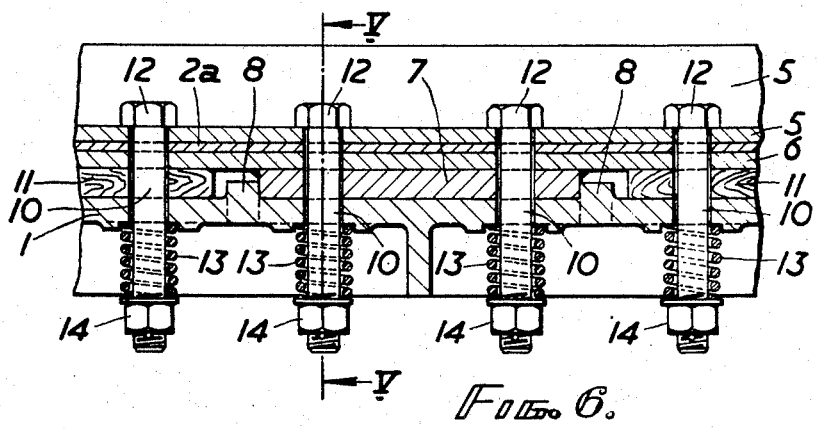
Figure 6 is a sectional end elevation of said mounting, the section being on line VI—VI of Figure 5.
Figure 7:
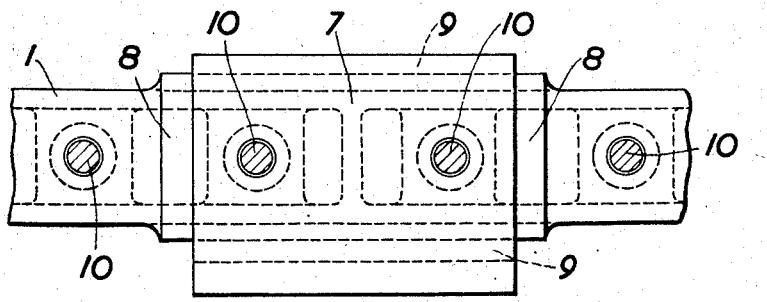
Figure 7 is a sectional plan of said mounting the section being taken on line VII—VII of Figure 5.

Referring now to Figures 5–7, the bracket G at its upper end comprises a supporting rail 1 which extends the full width of the tank C. The bottom 2 of the tank C is shown connected to the end wall 3 by means of inner and outer angle section lengths 4 and 5. Said bottom 2 is extended to the outside at $2a$ beyond the end wall 3, and, welded to the underside of said bottom 2 and its extending portion $2a$ is a plate 6 which extends the full width of the tank. At two positions directly above the side members of the frame A, said plate 6 has welded to the underside thereof two respective rectangular plates 7. These plates rest upon the supporting rail 1, and thereby the end of the tank C is supported.

It will be seen from Figure 7 that the top of the supporting rail 1 is slightly widened at the places where it supports the plates 7. At the ends of each widened portion said supporting rail 1 is formed with upstanding ribs 8 which extend across it, and the ends of the corresponding plate 7 fit between said ribs 8, and thus movement of the tank C transversely relative to the frame A is prevented. Also each plate 7 is formed with two ribs 9 on its underside which overhang the sides of the corresponding widened portion of the supporting rail 1, and thus movement of said tank C longitudinally of the frame A is prevented.

Between the plate 6 and the supporting rail 1, except where the plates 7 are located, spacers 11 of say, wood, are provided.

The tank C is held down with a spring bias on to the supporting rail 1 by means of a number of vertical bolts 10 which, as clearly shown, pass freely through said supporting rail 1, a plate 7 or spacer 11, the plate 6, the extended portion 2a of the tank bottom and the horizontal flange of the angle section member 5. The heads 12 of said bolts rest on said horizontal flange and coil springs 13 on said bolts are in compression between said supporting rail 1 and nuts 14 screwed on the lower ends of said bolts. By means of the nuts 14 the compression of the springs 13 can be adjusted, and thereby the force whereby the tank is pulled down is adjusted.

It will now be seen that the tank C while being positively retained against horizontal movement in any direction relative to the frame A is capable of limited movement upwards from said frame in opposition to the bias of the springs 13 and thus, as above described, distortions of the framework A can take place without excessive strains being transmitted to the structure of the tank.

Referring now to Figure 8, each bracket H at its upper and outer end has rigidly bolted to it a supporting rail 15 extending longitudinally of the tank. The bottom 2 of the tank merges into the side wall 16 on a smooth curve and a curved plate 17 of the same longitudinal extent as the supporting rail 15 is welded to the outside of the curved portion of the tank as clearly shown. An intermediate casting 18 is provided having an upper curved and inclined flange 19 which is welded to the plate 17, and a lower horizontal flange 20. The flanges 19 and 20 are of the same longitudinal extent as the supporting rail 15 and the plate 17.

Welded to the underside of the flange 20 at about the middle of the length thereof is a rectangular plate 21. Said plate 21 rests on the supporting rail 15.

Said plate 21 is the equivalent of the plate 7 of Figures 5-7 and the supporting rail 15 is the equivalent of the supporting rail 1 of Figures 5-7. Said plate 21 is formed with a rib 22 on its underside which overhangs the inner longitudinal edge of the supporting rail 15 and thus, since there is a similar arrangement on each side of the tank, the tank is positively prevented from lateral movement relative to the frame A. Said supporting rail 15 may be formed with two ribs (not seen) on its upper surface between which the ends of the plate 21 fit (in the same manner as the ends of the plate 7 of Figures 5-7 fit between the ribs 8) and thus the tank may be positively prevented from longitudinal movement relative to the frame. However, it need not be necessary in the case of these side mountings to provide means for preventing longitudinal movement between the tank and the frame, the end mounting alone being relied on to prevent this.

Vertical bolts 23 pass freely through the supporting rail 15, the plate 21 and the flange 20 of the casting 18, as clearly shown. Said bolts have heads 24 which rest on said flange 20 and coil springs 25 on said bolts are in compression between the under surface of the rail 15 and nuts 26 screwed on the lower ends of said bolts. Thus, in an analogous manner to Figures 5-7, the flange 20 and therefore the tank C is held down by an adjustable spring bias, so that, as before, distortions of the framework A can take place without excessive strains being transmitted to the structure of the tank.

In an analogous manner to the case of Figures 5-7, spacers of, say wood, will be provided between the rail 15 and the flange 20 beyond the ends of the plate 21 and some of the bolts will of course pass through these spacers instead of through the plate 21.

Referring now to Figures 3 and 4, these illustrate an ordinary tender comprising a tank J mounted on a frame K which in turn is mounted on track wheels L. In the present arrangement the forward end of the tank J is supported on a lateral supporting rail 1 which is mounted across the side members of the frame K, and the rear end of the tank is supported at the sides by the side members of the frame K themselves.

The forward mounting on the lateral supporting rail 1 may be precisely the same as that illustrated in Figures 5-7 and no further description is therefore deemed necessary.

For supporting the rear end of the tank J on the side members of the frame K, the bottom 27 of said tank at each side near said rear end has a rectangular plate 28 welded to it, said plate extending some distance longitudinally of the tank as shown in Figure 4. The outer portion of each plate 28 rests direct on the side member of the frame K as shown in Figure 9.

Along the under side of the inner portion of said plate 28 is welded a member of channel section, arranged as shown with one (29) of its channel walls welded flush against said plate 28 and with its channel bottom 30 facing the inner face of the side member of the frame K. A plate 31 is bolted flush against said inner face of said side member, and the inner face of this plate 31 abuts against the outer face of the channel bottom 30. An angle section member is bolted to the inner face of said plate 31 with its upper flange 32 extending horizontally inwards from said plate 31 and a little beneath the lower channel wall 33 of the channel section member. The plate 31 and the channel section and angle section members are all of the same longitudinal extent as the plate 28.

A number of vertical bolts 34 extend freely through the flanges 32 and 33, said bolts being spaced at intervals along said flanges. The heads 35 of said bolts abut against the under side of the flange 32. Helical springs 36 are coiled on said bolts above the flange 33 and are in compression between said flange and nuts 37 screwed on said bolts.

Thus each plate 28 rests on the respective side member of the frame K and is held down on said side member by the springs 36. As before the plates 28 and therefore the tank bottom 27 can be raised from said frame members in opposition to said springs so that distortions of said frame members do not unduly strain the tank.

It will be seen that, owing to the contact between each plate 31 and the adjacent channel bottom 30 of the channel section member, sidewise movement of the tank relative to the frame is prevented. These rear side mountings as before stated need not provide means for preventing longitudinal movement of the tank relative to the frame, as the forward mounting may be sufficient for this purpose. If it is desired that said rear mountings will also prevent longitudinal relative movement between the tank and the frame, ribs will be provided on the inner surface of the plate 31 which abut against the ends of the channel bottom 30 of the channel section member.

Referring to Figures 10 and 11, these figures illustrate a mounting for one side of a tank when the side walls of the tank are vertical and join the horizontal bottom at a right angle. The mounting is very similar to that of Figures 5, 6 and 7, but adapted for the side instead of the end of a tank.

Thus a supporting rail 38 is mounted on the appropriate side frame member either direct or through a suitable bracket. The bottom 39 of the tank is connected to the side wall 40 by means of inner and outer angle section members 41 and 42. Said bottom 39 is extended to the outside at 39a beyond the side wall 40, and welded to the underside of said bottom 39 and its extended portion 39a is a plate 43 which is of the required longitudinal extent. About mid way of its length said plate 43 has welded to the underside of it a rectangular plate 44 which extends an appropriate portion of the length of said plate 43. This plate 44 rests on the supporting rail 38, the top of which, as seen from Figure 11, is slightly widened at the place where it supports said plate 44.

A longitudinal flange 45 is formed on the underside of said plate 44 and abuts against the inner side of the supporting rail 38, and thus, as there is a mounting at each side of the tank, sideways movement of the tank relative to the frame is prevented. In the present case these side mountings do not provide for the prevention of longitudinal movement of the tank relative to the frame this being prevented only by the end mounting as heretofore described.

Bolts 46 with coil springs 47 thereon function in the same way as the bolts 10 and springs 13 of Figures 5–7, as will be clear from the drawing. Spacers (not shown) similar to the spacers 11 will preferably be provided beyond the ends of the plate 44 between the supporting rail 38 and the plate 43.

The flanges 48 and 49 are for attaching the supporting rail 38 to the bracket or direct to the frame member. These for the sake of clearness have been omitted from Figure 11.

I claim:

1. A railway vehicle comprising a supporting structure having a plurality of spaced projections on the upper surface thereof, railway wheels on which said supporting structure is mounted, a container structure seated upon said supporting structure, said container structure having a plurality of spaced projections depending therefrom, said container structure projections and said supporting structure projections providing at least two substantially-parallel spaced pairs of co-engaging contiguous surfaces, the projections between said first spaced pairs of co-engaging surfaces being from one structure and the opposed projections being from the other structure, and at least two second substantially-parallel spaced pairs of co-engaging contiguous surfaces angularly arranged with respect to said first pairs of co-engaging surfaces, the projections between said second spaced pairs of co-engaging surfaces being from one structure and the opposed projections being from the other structure, so that relative horizontal movement between said container structure and said supporting structure is prevented both laterally and longitudinally of said supporting structure, vertical members extending through colinear holes in adjacent horizontal portions of each of said structures, each of said members having a head at each end thereof on either side of the adjacent portions of said structures, and coil springs coiled on said members and in compression between one of the structures and one of the heads on said memebrs to bias the container structure onto said supporting structure, whereby only vertical movement of the container structure with respect to the supporting structure will be permitted upon yielding of the springs due to distortion of said supporting structure.

2. A railway vehicle comprising a supporting structure, railway wheels on which said supporting structure is mounted, a container structure, a plurality of spaced-apart mounting units secured rigidly to the underside of said container structure, said supporting structure having seating surfaces and said mounting units resting on said seating surfaces, said seating surfaces having a plurality of projections extending from the upper surfaces thereof and said mounting units having a plurality of projections depending therefrom, said mounting unit projections and said seating surface projections providing at least two first substantially-parallel spaced pairs of co-engaging contiguous surfaces, the projections between said first spaced pairs of co-engaging surfaces being associated with one structure and the opposed projections being associated with the other structure, and at least two second substantially-parallel spaced pairs of co-engaging contiguous surfaces angularly arranged with respect to said first pairs of co-engaging surfaces, the projections between said second spaced pairs of co-engaging surfaces being associated with one structure and the opposed projections being associated with the other structure, so that relative horizontal movement will be prevented between said mounting units and said supporting structure both laterally and longitudinally of said supporting structure, and spring means biasing each mounting unit onto its associated seating surface, said spring means allowing vertical movement of said container with respect to said supporting means, whereby only vertical movement of the container structure with respect to the supporting structure will be permitted upon yielding of the spring means due to distortion of said supporting structure.

3. A railway vehicle comprising a supporting structure, railway wheels on said supporting structure is mounted, a container, an elongated mounting unit secured rigidly to the underside of said container adjacent one end thereof and extending transversely of said container, two elongated mounting units secured rigidly to the underside of said container, one on each side and near the other end thereof, and extending longitudinally of said container, said supporting structure having firm seating surfaces and said mounting units resting on said firm seating surfaces, said supporting structure and said mounting units having co-engaging vertical surfaces preventing relative horizontal movement between said mounting units and said supporting structure both laterally and longitudinally of said supporting structure, and a plurality of helical springs biasing each mounting unit down onto its seating surface, said helical springs being arranged in a row extending longitudinally of said mounting unit.

4. A railway vehicle comprising a supporting structure, railway wheels on which said supporting structure is mounted, a container structure, a plurality of spaced mounting units secured rigidly to the underside of said container structure, said supporting structure having seating surfaces and said mounting units resting on said seating surfaces, said seating surfaces having projections on the upper surfaces thereof and said mounting units having projections depending therefrom, said mounting unit projections and said seating surface projections providing at least two first substantially-parallel spaced pairs of co-engaging contiguous surfaces, the projections between said first spaced pairs of co-engaging surfaces being associated with one structure and the opposed projections being associated with the other structure, and at least two second substantially-parallel spaced pairs of co-engaging contiguous surfaces angularly arranged with respect to said first pairs of co-engaging surfaces, the projections between said second spaced pairs of co-engaging surfaces being associated with one structure and the opposed projections being associated with the other structure, so that relative horizontal movement will be prevented between said mounting units and said supporting structure both laterally and longitudinally of said supporting structure, and spring means biasing each mounting unit onto its seating surface to allow vertical movement of said container structure with respect to said supporting structure, said spring means including vertical members extending through colinear holes in adjacent horizontal portions of the mounting units and the seating surfaces, each of said members having a head at each end thereof on either side of the adjacent horizontal portions, and coil springs coiled on said members and in compression between one of the horizontal portions and one of the heads on said members to bias the container structure onto said supporting structure, whereby only vertical movement of the container structure with respect to the supporting structure will be permitted upon yielding of the springs due to distortion of said supporting structure.

5. A railway vehicle comprising a supporting structure, railway wheels on which said supporting structure is mounted, a container structure seated on said supporting structure, means including a plurality of spaced generally-vertical surfaces on said supporting structure contiguous with spaced generally-vertical surfaces on said container structure for preventing relative horizontal movement between said container structure and said supporting structure both laterally and longitudinally of said supporting structure and for permitting only vertical movement of said container structure with respect to said supporting structure, and means for resiliently biasing said container structure onto said supporting structure comprising vertical members extending through colinear holes in adjacent horizontal portions of each of said structures, each of said members having a head at each end thereof on either side of the adjacent portions of said structures, and coil springs coiled on said members and in compression between one of the structures and one of the heads on said members to bias the container structure onto said supporting structure, whereby only vertical movement of the container structure with respect to the supporting structure will be permitted upon yielding of the springs due to distortion of said supporting structure.

References Cited in the file of this patent

UNITED STATES PATENTS

| | | |
|---|---|---|
| 751,040 | Anderson | Feb. 2, 1904 |
| 1,079,248 | Kohler | Nov. 18, 1913 |
| 1,097,961 | Allyn et al. | May 26, 1914 |
| 1,252,959 | Shoemaker | Jan. 8, 1918 |
| 1,663,036 | Ashe et al. | Mar. 20, 1928 |
| 1,829,962 | Muhlfeld | Nov. 3, 1931 |
| 1,883,306 | Lewis | Oct. 18, 1932 |
| 2,100,371 | Bachman | Nov. 30, 1937 |
| 2,606,039 | La Rue | Aug. 5, 1952 |

FOREIGN PATENTS

| | | |
|---|---|---|
| 423,962 | France | May 2, 1911 |

U. S. DEPARTMENT OF COMMERCE
PATENT OFFICE

CERTIFICATE OF CORRECTION

Patent No. 2,819,686                                January 14, 1958

James Hadfield

It is hereby certified that error appears in the printed specification of the above numbered patent requiring correction and that the said Letters Patent should read as corrected below.

Column 6, line 27, after "on" insert -- which --.

Signed and sealed this 18th day of March 1958.

(SEAL)
Attest:

KARL H. AXLINE
Attesting Officer

ROBERT C. WATSON
Commissioner of Patents